US008978726B2

(12) United States Patent
Detout et al.

(10) Patent No.: US 8,978,726 B2
(45) Date of Patent: Mar. 17, 2015

(54) FLAT-RUNNING DEVICE FOR MOTOR VEHICLE AND MOUNTED ASSEMBLY INCORPORATING SAME

(75) Inventors: Arnaud Detout, L'Isle Adam (FR); Florence Ratet, Parmain (FR); Olivier Marsaly, Princeton, NJ (US)

(73) Assignee: Hutchinson, Paris (FR)

( * ) Notice: Subject to any disclaimer, the term of this patent is extended or adjusted under 35 U.S.C. 154(b) by 446 days.

(21) Appl. No.: 12/938,514

(22) Filed: Nov. 3, 2010

(65) Prior Publication Data

US 2011/0126955 A1 Jun. 2, 2011

(30) Foreign Application Priority Data

Nov. 4, 2009 (FR) ..................................... 09 05284

(51) Int. Cl.
*B60C 17/04* (2006.01)
*B60C 17/06* (2006.01)

(52) U.S. Cl.
CPC ................ *B60C 17/06* (2013.01); *B60C 17/04* (2013.01); *B60C 17/041* (2013.01)
USPC ............ 152/520; 152/158; 152/396; 152/399

(58) Field of Classification Search
USPC ................................. 152/158, 520, 396, 399
See application file for complete search history.

(56) References Cited

U.S. PATENT DOCUMENTS

| | | | | |
|---|---|---|---|---|
| RE32,693 E * | 6/1988 | Winfield | ...................... | 152/158 |
| 7,264,031 B2 * | 9/2007 | Clouet | .......................... | 152/520 |
| 2008/0163967 A1 * | 7/2008 | Heuze et al. | ................. | 152/520 |

FOREIGN PATENT DOCUMENTS

| | | | |
|---|---|---|---|
| EP | 1 588 870 | A1 | 10/2005 |
| JP | 59-156808 | A | 9/1984 |
| WO | WO 03/106199 | A1 | 12/2003 |

* cited by examiner

*Primary Examiner* — Adrienne C Johnstone
(74) *Attorney, Agent, or Firm* — Alston & Bird LLP

(57) ABSTRACT

Flat-running device for fitting to a tubeless mounted assembly for a motor vehicle and a mounted assembly incorporating same is provided. The device is configured for a wheel rim (in several parts includes an annular supporting structure of the casing designed to be mounted around the rim and divided into sectors in an arc of a circle that are articulated together by connection members, and members for locking the beads against these edges which are designed to connect the annular supporting structure to these beads. The connection members including two spindles extending in the axial direction and respectively attached in two adjacent sectors and connected together by an articulation extending in the circumferential direction of the device, the articulation having a rigid lug with two through-holes or else a flexible link with two loops, the or the link being articulated on these spindles by these two holes or loops, respectively.

14 Claims, 7 Drawing Sheets

FLAT-RUNNING DEVICE FOR MOTOR VEHICLE AND MOUNTED ASSEMBLY INCORPORATING SAME

FIELD OF THE INVENTION

The present invention relates to a flat-running device designed to be fitted to a tubeless mounted assembly for a motor vehicle and such a mounted assembly incorporating this device, making it possible to travel a considerable distance at relatively high speed when the mounted assembly is partially or totally deflated. This flat-running device is able to be used notably for fitment to a military vehicle designed to travel over all types of terrains including sandy terrains.

BACKGROUND

The known flat-running devices usually consist of a supporting ring mounted with clearance around a wheel rim inside a tire casing. This ring, because of its width at its base, exerts a force pressing the casing onto the rim. Sometimes used are rigid devices in several sectors that are attached in twos. Thus, document EP-A-1 541 384 in the name of the Applicant presents a flat-running device for a mounted assembly with a rim with several portions of the bolted type comprising, on the one hand, a supporting ring of the hollow type designed to be mounted around the rim and divided into at least two ring sectors mounted independently of one another and, on the other hand, means for locking the beads of the casing against the rim edges that are designed to connect the ring sectors to these beads, for the purpose of ensuring the driving function of the mounted assembly in the event of reduced or zero pressure in the latter.

Document EP-A-233 547 also discloses a flat-running device for a multilock rim (i.e. not bolted) which is mounted on the rim by means of a flexible elastic shoe, the ribbed lateral edges of which are designed to press against the beads of the tire casing. In this device, the ring sectors are articulated together in twos by fitting into one another in the circumferential direction, via an axial pivot forming a hinge which passes right through the two sectors that it connects and on which these sectors can pivot.

A major drawback of the latter flat-running device with sectors articulated by hinges lies notably in the rigid character of these articulations because of the aforementioned fitment and hinge.

Document EP-A-1 588 870 presents an annular supporting structure with articulated ring sectors specifically for a one-piece wheel rim with circumferential well, the structure being able to be used without means for locking the beads against the rim edges. Each articulation between sectors consists of at least two link rods articulated on one another thus forming a complex deformable articulation with the two articulation holes in which the two transverse spindles are mounted that belong respectively to both link rods and not to only one and the same rigid lug, which notably has the drawback of making the articulations complex.

SUMMARY

One object of the present invention is to propose a flat-running device designed to be fitted to a tubeless mounted assembly for a motor vehicle which comprises a wheel rim in several parts and a tire casing comprising beads mounted against edges of said rim, said device comprising:

- an annular supporting structure which is designed to be mounted around the rim for the purpose of supporting the casing, following a drop in inflation pressure inside the mounted assembly, and which is divided into at least two ring sectors in an arc of a circle suitable for forming the structure by juxtaposition in the circumferential direction, these sectors being articulated together in twos in this direction by connection means, and
- means for locking the beads against these edges which are designed to connect said annular supporting structure to these beads, which notably makes it possible to remedy this drawback by giving the device increased flexibility.

For this purpose, a device according to the invention is such that said connection means are located between the two lateral faces of each of the two sectors that they articulate together, and comprise two spindles extending in the axial direction of the device which are respectively attached in two facing connection ends of these sectors and which are connected together by an articulation extending in the circumferential direction of the device, said articulation consisting of at least one rigid lug with two through-holes or else of at least one flexible link with two loops, said at least one lug or said at least one link being articulated on these spindles by these two holes or loops, respectively.

"Spindles" in this instance mean in a known manner pivots on which, according to the present invention, said articulation articulates in the manner of a movable joint, which confers the desired flexibility on the device according to the invention.

For each articulation, it will be noted that the or each lug or else the or each flexible link, as appropriate, is articulated alone on these two spindles, unlike each complex articulation of the aforementioned document EP-A-1 588 870.

According to another feature of the invention, said locking means may advantageously comprise a pair of one-piece annular wedges which are pressed axially on either side of said supporting structure and facing a radially internal zone of this structure where said spindles are mounted so as to position and to immobilize the latter inside the corresponding sectors by the lateral locking of these spindles at the radial height determined by these wedges.

Each of these two wedges may have a substantially trapezium-shaped axial section the small and large bases of which define respectively radially inner and outer surfaces of said locking means, each wedge preferably being based on rubber that is reinforced by a circumferential reinforcing element.

According to another feature of the invention, said spindles may be formed of two spindles for example with shoulder which are respectively mounted in said two through-holes or loops of said articulation and which are attached inside the two corresponding articulated sectors.

According to one exemplary embodiment of the invention, one of the ends of each sector, or male end, may advantageously terminate in a fitting male member which protrudes in the circumferential direction radially above said articulation and which is capable of partially fitting into a female end of the adjacent sector.

As a variant, the articulated sectors may be capable of moving reversibly relative to one another in the axial direction and in torsion about the circumferential direction via said locking means, under the effect of lateral shearing or compression forces applied to the casing when running flat or in the inflated state. This device according to the invention can therefore absorb the impacts while running flat and in the low-pressure inflated state by reversible both axial and torsional adjustments, via the ability of these connection means to deform.

The articulation according to this variant is then for example of the rigid type and consists of said at least one (for example metal or plastic) lug or pin articulated on these spindles which is capable of sliding axially and of pivoting on the latter so as to allow this reversible movement of the sectors thus articulated. As a variant, this articulation may be of deformable type and consist of said at least one flexible link articulated via said two loops on these spindles, such as at least one textile cable and/or one metal cable, this link being capable of moving on these spindles so as to allow this reversible movement of the sectors.

According to another feature of the invention, the two ends of each sector may be recessed over a substantially middle portion of their axial width so as to form, in each sector end, a recess which extends over at least a portion of the length of the sector in the circumferential direction and which is delimited axially by two axial recess faces both traversed by said spindle attached to this sector end.

Advantageously, each spindle may axially traverse right through the sector incorporating it, via an axial through-housing which is formed between each axial recess face and the lateral face facing this sector and which receives this spindle.

According to another feature of the invention, said two recesses of the two respective connection ends of each sector may extend radially from the radially inner face of this sector, each recess having a substantially rectangular axial section.

According to a first embodiment of the invention, said two recesses of each sector extend to the radially outer face of this sector, thus traversing in the radial direction of the latter.

According to a second embodiment of the invention, said two recesses of each sector terminate radially at a distance from the radially outer face of this sector, thus being blind in the radial direction of the latter, each sector optionally being surmounted by a rubber-based protective coating. This protective coating may advantageously consist of a rigid rubber or else of a flexible rubber/reinforcement elements composite.

It will be noted that this rubber protective portion makes it possible not only to protect the radially outer face of the annular supporting structure, but also to protect the tire casing when running in the inflated state when there is an impact for example, in the event of contact of the device with the sidewalls or the top of the casing.

According to another feature of the invention that is common to these two embodiments, each of said sectors may, without distinction, have a solid, hollow or holed structure (for example holed on its radially inner face and/or on its lateral faces), and it is preferably made of a plastic or composite material. Still more preferably, a composite material is used that can comprise a polymer matrix (for example a polyamide or an epoxy resin) reinforced by a framework of glass or carbon fibers.

A tubeless mounted assembly according to the invention for a motor vehicle comprises a wheel rim in several parts, a tire casing comprising beads respectively mounted against axially inner and outer edges of the rim, and a flat-running device mounted around the rim between said edges, and this mounted assembly is characterized in that the device is as defined above.

Advantageously, said rim is of the two-part bolted type and may have a substantially flat rim bottom (that is, with no rim well).

BRIEF DESCRIPTION OF THE DRAWINGS

Other features, advantages and details of the present invention will emerge on reading the following description of several embodiments of the invention given by way of illustration and not being limiting, said description being made with reference to the appended drawings, amongst which.

DETAILED DESCRIPTION

In the present description, the expressions "axially inner" and "axially outer" refer respectively to the sides of the wheel rim which are designed to be turned toward the inside and toward the outside of the motor vehicle, following the mounting onto a vehicle of a mounted assembly comprising this rim.

Figure 1:
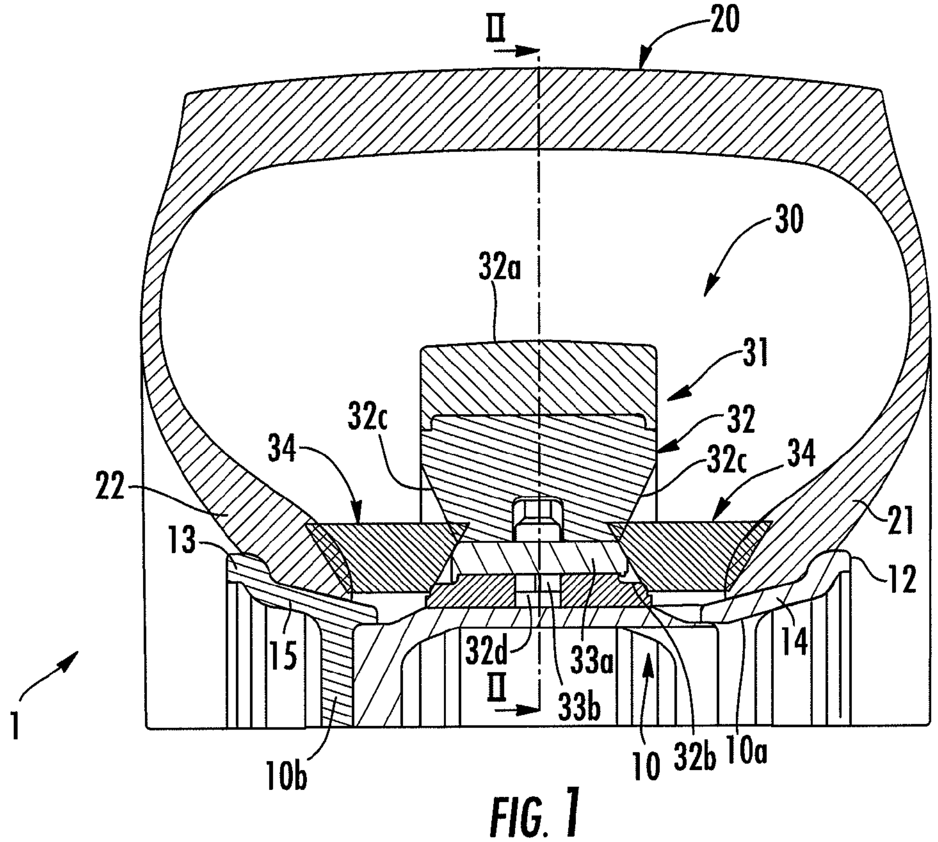
FIG. 1 is a view in axial half-section of a mounted assembly incorporating a flat-running device according to a first embodiment of the invention incorporating rigid means of connection between sectors.

The mounted assembly 1 according to the invention, which is illustrated in FIG. 1, comprises a wheel rim 10 with two parts 10*a* and 10*b* secured to one another by attachment means (not illustrated) of the bolt type.

The two parts 10*a* and 10*b* comprise respectively axially inner and outer edges 12 and 13 delimiting respectively two rim seats 14 and 15 extending axially from the edges 12 and 13, a tire casing 20 of which the beads 21 and 22 are mounted resting on the seats 14 and 15 against the edges 12 and 13, and a flat-running device 30 mounted around the rim 10 inside the casing 20 and designed to support the latter following a drop in inflation pressure inside the mounted assembly 1.

In the example of FIG. 1, the device 30 is mounted on a rim bottom 10 that is of the substantially flat type. This device 30 comprises:

- an annular supporting structure 31 which is designed to be mounted on the rim 10 for the purpose of supporting the casing 20, following a drop in inflation pressure inside the mounted assembly 1, and which is divided into ring sectors 32 each in an arc of a circle and of solid structure which are articulated together via connection means 33 and which are suitable for forming the structure 31 by juxtaposition in the circumferential direction of the latter, and annular wedges 34 for locking the beads 21 and 22 against the edges 12 and 13 which are designed to connect the structure 31 to the beads 21 and 22 and which are each in a single piece, being based on rubber that is reinforced by a circumferential reinforcement element (not illustrated), these wedges 34 being pressed laterally on a radially inner zone of the sectors 32 situated facing the connection means 33 so as to hold them in position when running.

Each ring sector 32 is preferably made of a composite material, such as a polyamide matrix reinforced by a framework of glass fibers, and it is according to this first embodiment surmounted radially by a protective coating 32*a* with a preferably rigid rubber base. It will be noted however that this coating 32*a* could, as a variant, consist of a flexible rubber/reinforcing elements composite.

As for the geometry of each ring sector 32, it has, in the example of FIG. 1 (see also FIGS. 3 and 4):

in said radially inner zone on which the locking wedges 34 rest, a substantially trapezoidal axial section which widens axially on the radially inner face of the sector 32 in order to form a base 32*b* of the latter and, in a radially outer zone surmounting the foregoing, an axial section substantially in the shape of an isosceles trapezium the large base of which coincides with the protective coating 32*a*.

Figure 2:
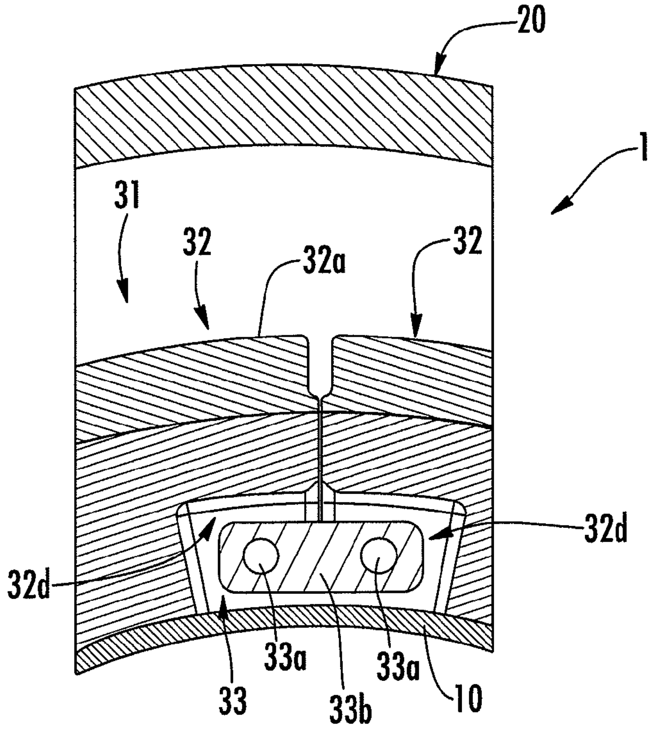
FIG. 2 is a view in circumferential half-section along the plane II-II of FIG. 1 of this mounted assembly.
Figure 6:
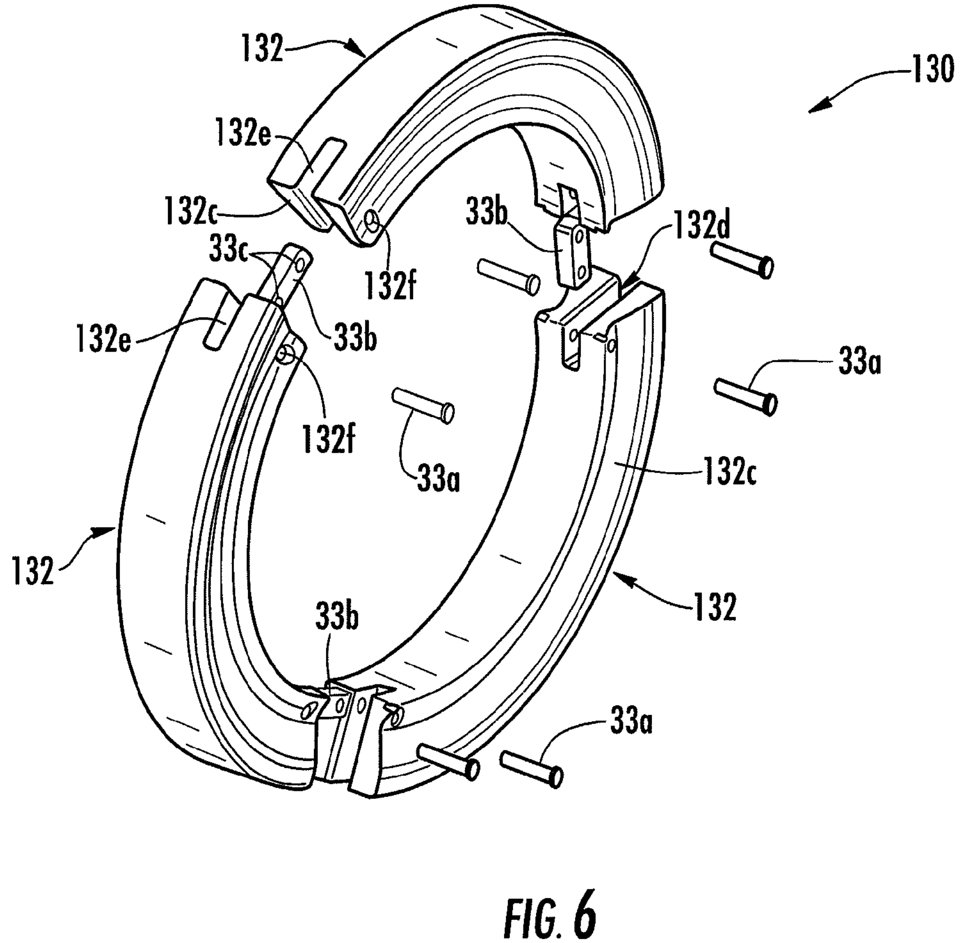
FIG. 6 is an exploded view in perspective of the supporting structure of a device with three sectors according to FIG. 5 to be connected together via rigid connection means according to the invention, which can also be used in the first embodiment of FIGS. 1 to 4.

As illustrated in FIGS. 1, 2 and 6, the connection means 33 for articulating the sectors 32 together in twos are located between the two lateral faces 32*c* of each of the two sectors 32 which they articulate together, and comprise two spindles 33*a* of the shouldered spindle type extending in the axial direction of the device 30, which are respectively attached in two facing connection ends of these sectors 32 via circumferential recesses 32*d* arranged in these ends (see FIGS. 2 and 6) and which are connected together by an articulated lug or pin 33*b* extending in the circumferential direction of the device 30.

Figure 3:
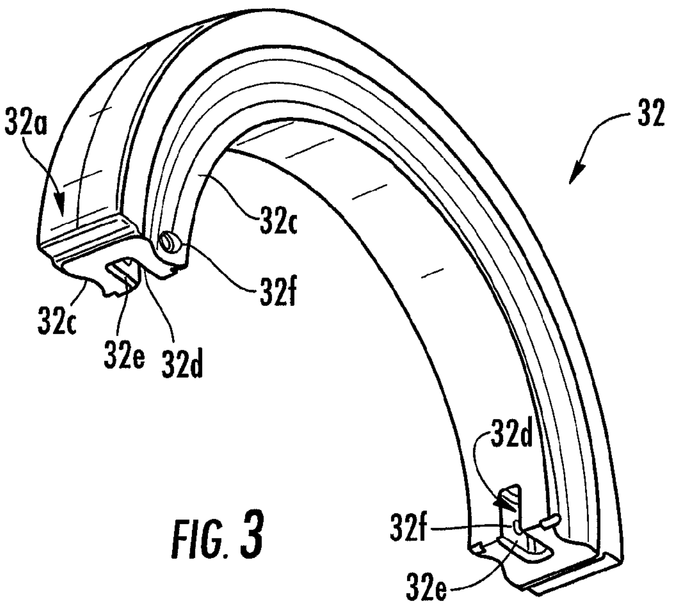
FIG. 3 is a view in perspective of a sector in an arc of a circle of the annular supporting structure of the device according to FIG. 1.
Figure 4:
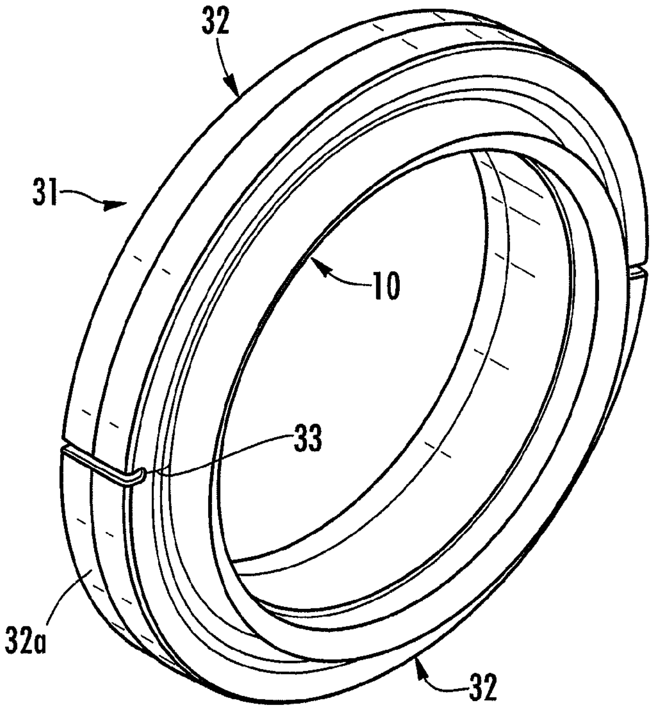
FIG. 4 is a view in perspective of the annular supporting structure of the device according to FIG. 1 comprising two sectors according to FIG. 3 that have been connected together.

More precisely, it is shown in FIG. 3 that the recess 32*d* formed at each end of a sector 32 extends over a portion of the length of this sector 32 in its circumferential direction and over a middle portion of its axial width like a gulley, and that each recess 32*d* is delimited axially by two axial recess faces 32*e* both traversed by the spindle 33*a* attached to this end of a sector 32. As can be seen in FIGS. 2 and 6, the two spindles 33*a* are respectively mounted in two through-holes 33*c* of the lug 33*b* and each traverse axially right through the corresponding end of a sector 32, via two axial through-housings 32*f*, 132*f* receiving each spindle 33*a* through this end of a sector 32, 132. It can be seen in FIGS. 1 and 6 that each of the two spindle housings 32*f*, 132*f* emerges both on an axial face 32*e*, 132*e* of a recess and on the lateral face 32*c*, 132*c* facing the sector 32.

As illustrated in all of FIGS. 1 to 6, the recess 32*d* which each of the two connection ends of a sector 32 has extends radially from the radially inner face of this sector 32 along a substantially rectangular axial section.

As illustrated in FIGS. 1 to 4 for the first embodiment of the invention according to which each sector 32 is surmounted by the protective coating 32*a*, the two recesses 32*d* of each sector 32 terminate radially at a distance from this coating 32*a*, thus being blind in the radial direction of the sector 32.

Figure 5:
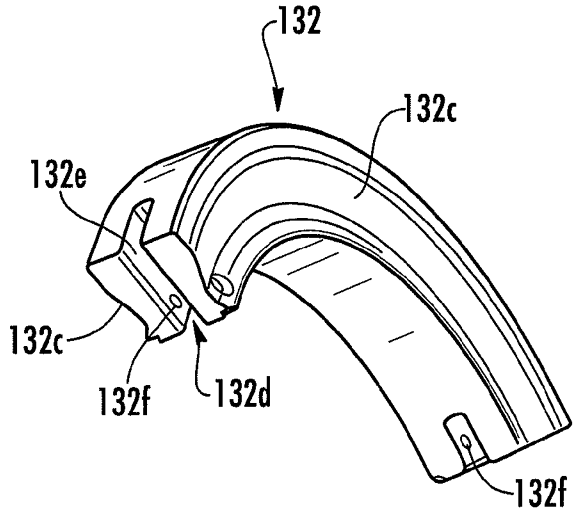
FIG. 5 is a view in perspective of a sector in an arc of a circle of an annular supporting structure of a flat-running device according to a second embodiment of the invention.

As illustrated in FIGS. 5 and 6 for the second embodiment of the invention according to which each sector 132 of the device 130 differs from each sector 32 according to the first embodiment only in that it is not surmounted by such a protective coating 32*a*, the two recesses or gulleys 132*d* of each sector 132 extend to the radially outer face of this sector 132, thus traversing in the radial direction of the latter. It will be noted that, according to this second embodiment, the connection means 33 are unchanged compared with those of the first embodiment of FIGS. 1 to 4.

To mount the flat-running device 30, 130 according to one or other of these two embodiments, the user advantageously proceeds in the following manner:

the sectors 32, 132 are first inserted end-to-end and not connected together inside the tire casing 20;

these sectors 32, 132 are placed facing one another inside the casing 20, both axially and radially as well as circumferentially, the sectors 32, 132 are connected together inside the casing 20 by assembling the connection means 33 (insertion of each lug 33*b* into the recesses 32*d*, 132*d* between two sectors 32, 132 and of the spindles 33*a* in the corresponding housings 32*f*, 132*f*, axially on either side of these recesses 32*d*, 132*d*), the two locking wedges 34 are positioned axially against these sectors thus connected and radially facing the spindles 33*a* in order to hold them in position when running, the flat-running device 30, 130 thus assembled is made to slide over the axially inner portion 10*a* of the bolted rim 10, then the axially outer portion 10*b* of this rim 10 is bolted to the portion 10*a*.

As indicated above, it will be noted that the sectors 32, 132 thus articulated can move reversibly relative to one another both axially and in mutual torsion, via the combined axial sliding and pivoting of the lug or pin 33*b* on the two spindles 33*a* and via the flexibility of the locking wedges 34, under the effect of lateral shearing or compression forces applied to the casing when running flat or in the inflated state.

Figure 7:
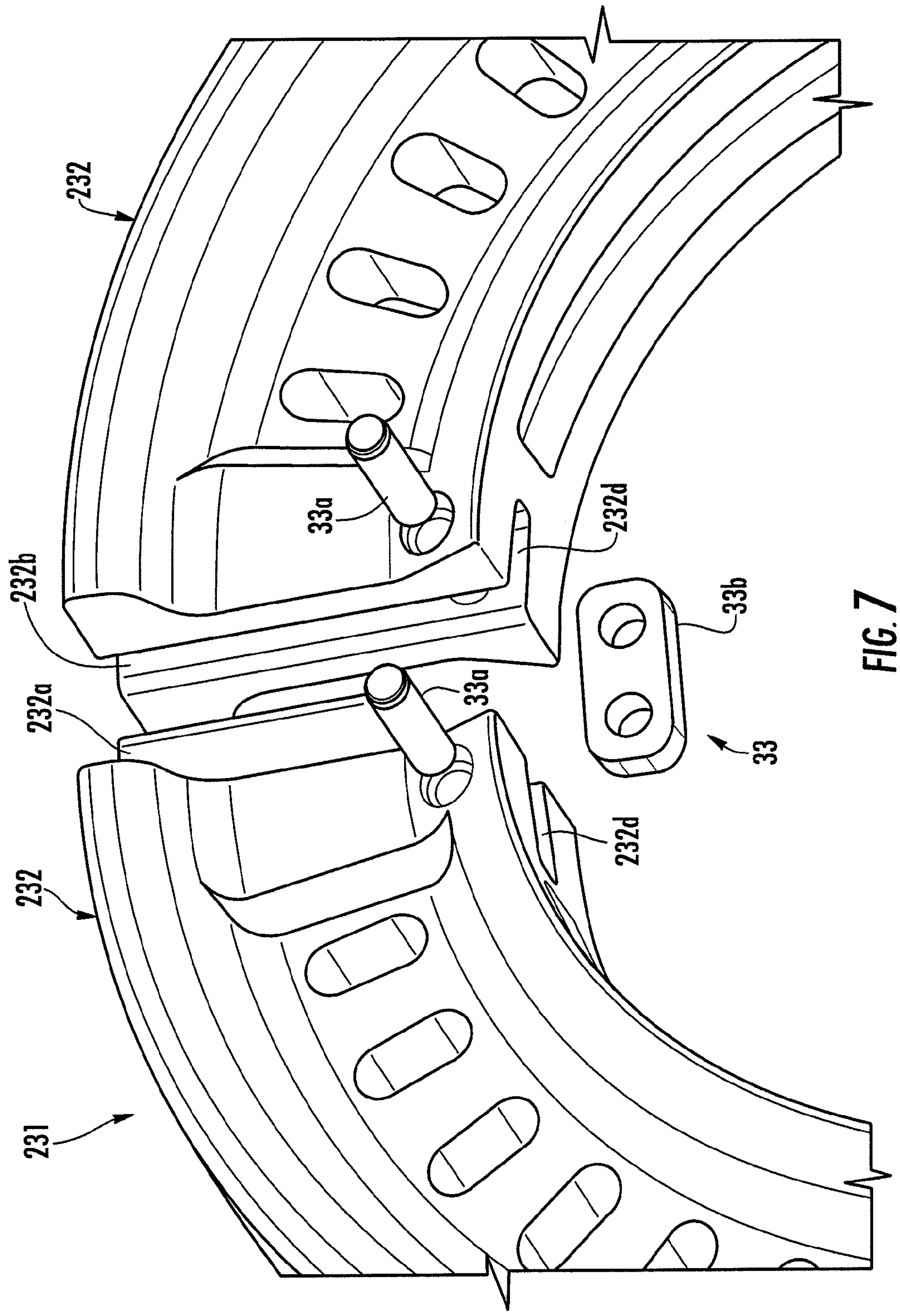
FIG. 7 is an exploded partial view in perspective of a supporting structure according to the second embodiment in which the sectors are to be connected together via rigid connection means similar to those of FIG. 6 and also by fitting of their facing ends.

The sectors 232 illustrated in FIG. 7 are according to the second embodiment of the invention in that their facing terminal recesses 232*d* extend in a traversing manner in the radial direction of these sectors 232. The connection means 33 used for these sectors 232 consist of a lug 33*b* articulated on two spindles 33*a* as has just been described with reference to FIGS. 1 to 6, but also of a tooth-shaped male member 232A by which one of the male ends of each sector 232 terminates and which protrudes in the radially circumferential direction above the lug 33*a* while being capable of partially fitting into a female end 232B of the adjacent sector 232. It will be noted that this partially fitted male member 232A is thus visible from the radially outer face of the corresponding supporting structure 231.

Figure 8:
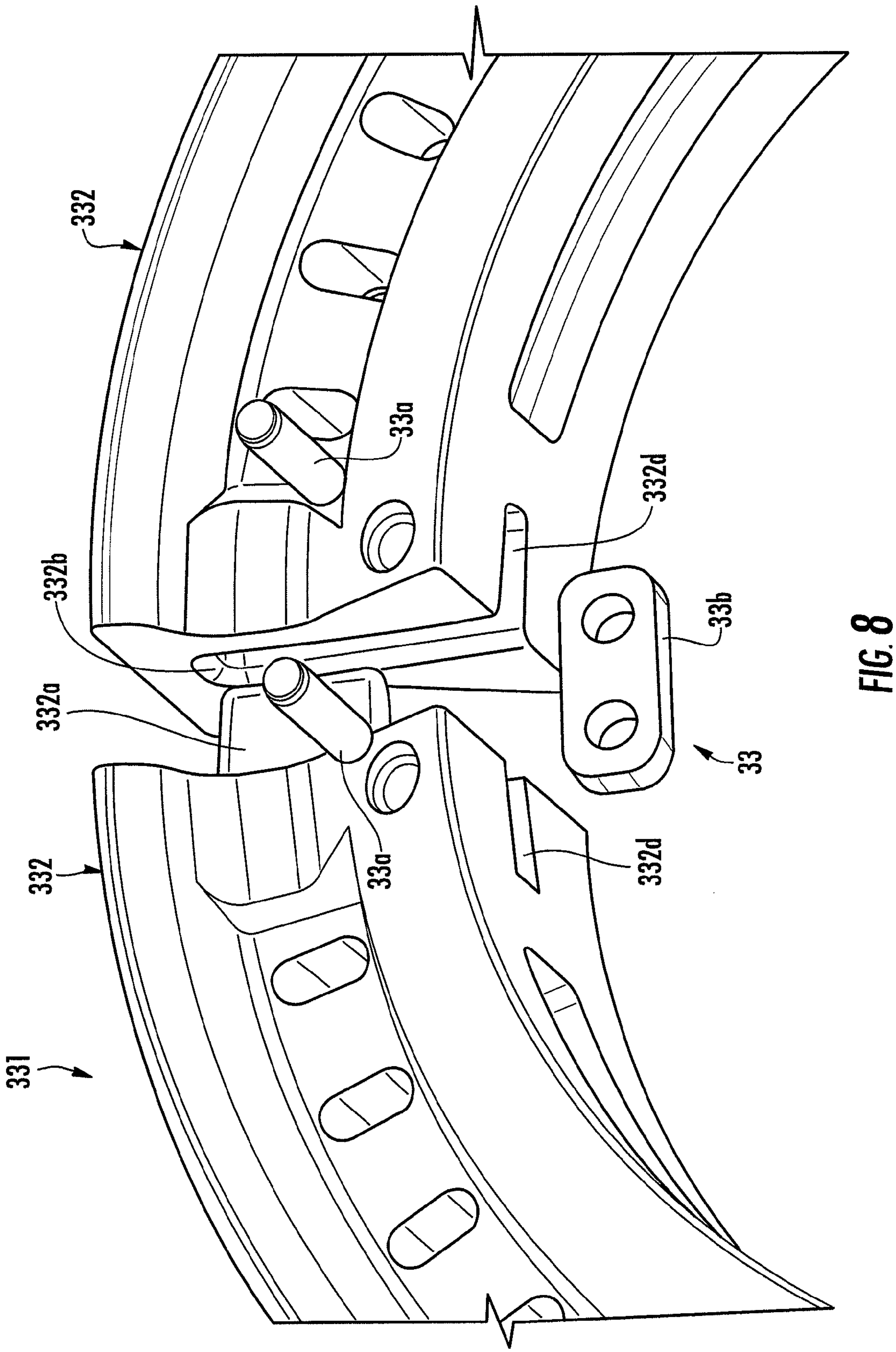
FIG. 8 is an exploded partial view in perspective of a supporting structure according to the first embodiment in which the sectors are to be connected together via the rigid connection means of FIG. 7 and by fitting of their facing ends.

The sectors 332 illustrated in FIG. 8 are according to the first embodiment of the invention in that their facing terminal recesses 332*d* terminate at a distance from the radially outer face of these sectors 332 because of the substantially "π" shape of each end face of the sector 332 delimiting this recess 332*d*. The connection means 33 used for these sectors 332 consist of a lug 33*b* articulated on two spindles 33*a* as above, and also of a tooth-shaped male member 332A (of a lesser radial height than that of the visible member 232A) by which one of the male ends of each sector 332 terminates and which protrudes in the radially circumferential direction above the lug 33*a* while being capable of partially fitting into a female end 332B of the adjacent sector 332. It will be noted that this partially fitted male member 332A is therefore not visible from the radially outer face of the corresponding supporting structure 331.

Figure 9:
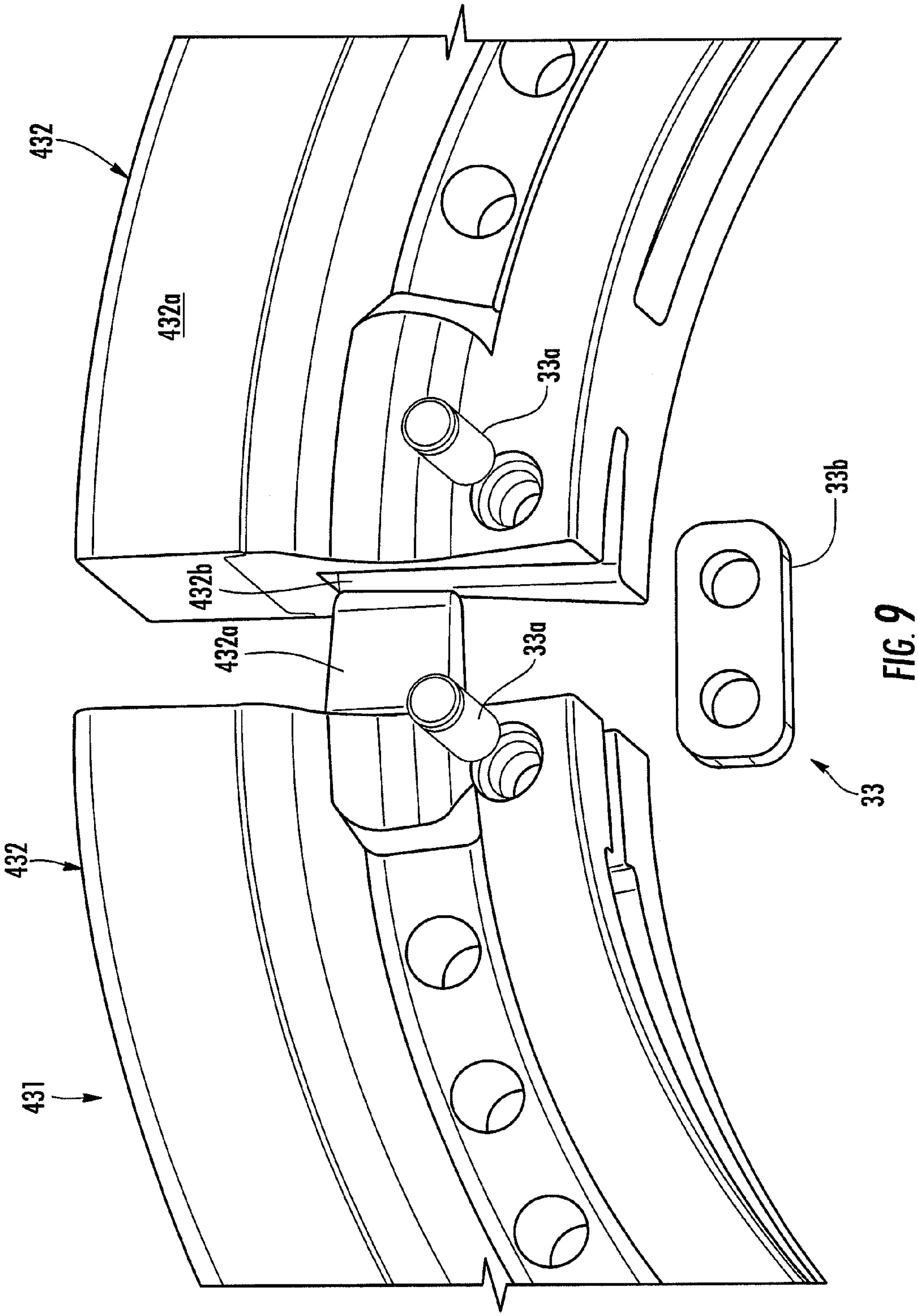
FIG. 9 is an exploded partial view in perspective of a supporting structure according to this first embodiment corresponding to a variant of FIG. 8, in which the sectors are to be connected together via these rigid connection means and by fitting of their facing ends.

The sectors 432 illustrated in FIG. 9 also conform to the first embodiment of the invention and differ only from those of FIG. 8 in that the basic structure of each sector 432 provided with a male member 432A fitted into the adjacent female end 432B is covered with a rubber-based coating 432*a* defining the radially outer face of the corresponding supporting structure 431.

Figure 10:
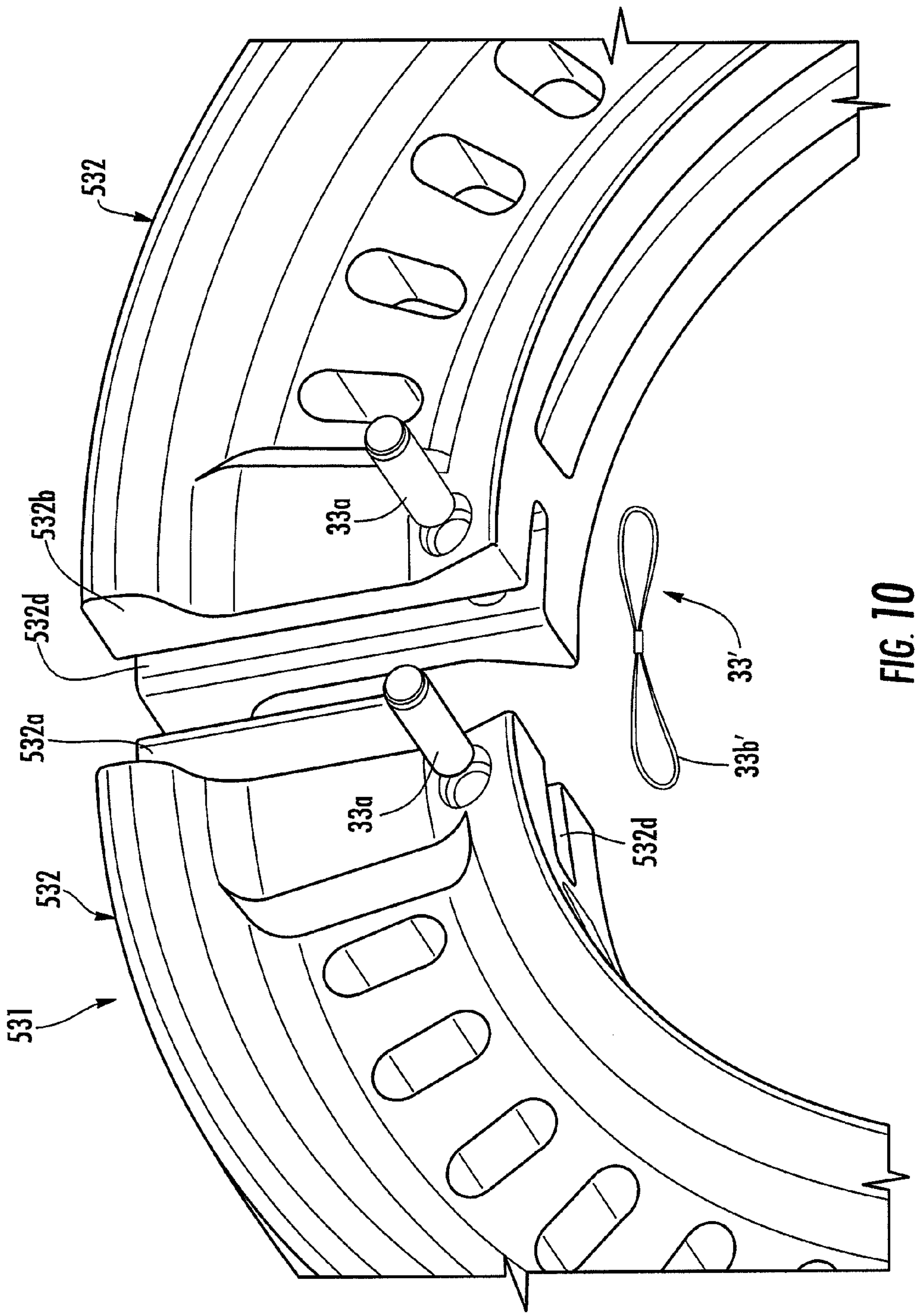
FIG. 10 is an exploded partial view in perspective of a supporting structure according to the second embodiment of the invention in which the sectors are to be connected together via deformable connection means and also by fitting of their facing ends.

The sectors 532 illustrated in FIG. 10 are according to the second embodiment of the invention for the supporting structure 531 in that their facing terminal recesses 532*d* traverse in the radial direction of the sectors 532. The connection means 33' used for these sectors 532 consist of a flexible link 33*b*' for example consisting of a textile or metal cable which forms two loops (for example in the shape of a FIG. 8) articulated on two spindles 33*a* similar to those cited above, but also a tooth-shaped male member 532A similar to that of FIG. 7 which partially fits into the female end 532B of the adjacent sector 532.

The invention claimed is:

1. Flat-running device configured to be fitted to a tubeless mounted assembly for a motor vehicle which comprises a wheel rim in several parts and a tire casing comprising beads mounted against edges of said rim, said device comprising:

an annular supporting structure configured to be mounted around the rim for the purpose of supporting the casing, following a drop in inflation pressure inside the mounted assembly, and which is divided into at least two ring sectors in an arc of a circle suitable for forming said structure by juxtaposition in the circumferential direction, these sectors being articulated together in twos in this direction by connection means, and means for locking the beads against these edges which are configured to connect said annular supporting structure to these beads, wherein said connection means are located between two lateral faces of each of the two sectors that they articulate together, and comprise two spindles extending in an axial direction of the device which are respectively attached in two facing connection ends of these sectors and which are connected together by an articulation extending in the circumferential direction of the device, said articulation consisting of at least one rigid lug with two through-holes or else of at least one flexible link with two loops, said or each lug or said or each link being articulated on these spindles by these two holes or loops, respectively, wherein the two connection ends of each sector form, in each sector end, a recess delimited axially by two axial recess faces both traversed by said spindle attached to each sector end, each recess extending radially from the radially inner face of this sector, wherein the two ends of each sector are recessed over a substantially middle portion of their axial width so as to form, in each sector end, said recess which extends over at least a portion of the length of the sector in the circumferential direction, each recess having a substantially rectangular axial section.

2. The flat-running device according to claim 1, characterized in that said locking means comprise a pair of one-piece annular wedges which are pressed axially on either side of said supporting structure and facing a radially inner zone of said supporting structure where said spindles are mounted so as to immobilize the latter inside the corresponding sectors.

3. The flat-running device according to claim 2, characterized in that each of said two wedges has a trapezoid-shaped axial section a small and large bases of which define respectively radially inner and outer surfaces of said locking means, each wedge consisting of rubber that is reinforced by a circumferential reinforcing element.

4. The flat-running device according to claim 1, characterized in that said spindles are formed of two spindles having shoulders which are respectively mounted in said two through-holes or loops of said articulation and which are attached inside the two corresponding articulated sectors.

5. The flat-running device according to claim 4, characterized in that the articulated sectors are capable of moving reversibly relative to one another in the axial direction and in torsion about the circumferential direction via said locking means, under the effect of lateral shearing or compression forces applied to the casing when running flat or in the inflated state.

6. The flat-running device according to claim 5, characterized in that each articulation, of rigid type and consisting of said at least one lug articulated on said spindles, is configured to slide axially and of pivoting on said spindles, so as to allow this reversible movement of the sectors thus articulated.

7. The flat-running device according to claim 5, characterized in that each articulation of deformable type and consisting of said at least one flexible link articulated via said two loops on said spindle, such as at least one textile cable and/or one metal cable, is capable of moving on these spindles so as to allow this reversible movement of the sectors thus articulated.

8. The flat-running device according to claim 1, characterized in that one of the ends of each sector, or male end, terminates in a fitting male member which protrudes in the circumferential direction radially above said articulation and which is capable of partially fitting into a female end of the adjacent sector.

9. The flat-running device according to claim 1, characterized in that each spindle axially traverses right through the sector incorporating it, via an axial through-housing which is formed between each axial recess face and the lateral face facing this sector and which receives this spindle.

10. The flat-running device according to claim 1, characterized in that said two recesses of each sector extend to the radially outer face of this sector, thus traversing in the radial direction of the latter.

11. The flat-running device according to claim 1, characterized in that said two recesses of each sector terminate radially at a distance from the radially outer face of this sector, thus being blind in the radial direction of the latter, each sector optionally being surmounted by a rubber-based protective coating.

12. The flat-running device according to claim 1, characterized in that each of said sectors is made of a plastic or composite material.

13. A tubeless mounted assembly for a motor vehicle, comprising a wheel rim in several parts, a tire casing comprising beads respectively mounted against axially inner and outer edges of the rim, and a flat-running device mounted around the rim between said edges, characterized in that said flat-running device is as defined in claim 1.

14. The mounted assembly according to claim 13, characterized in that said rim is of the two-part bolted type and has a substantially flat rim bottom.

* * * * *